US010494142B2

(12) United States Patent
Noe

(10) Patent No.: US 10,494,142 B2
(45) Date of Patent: Dec. 3, 2019

(54) PALLET ADAPTER

(71) Applicant: The Boeing Company, Chicago, IL (US)

(72) Inventor: Darrin Michael Noe, Arlington, WA (US)

(73) Assignee: THE BOEING CO., Chicago, IL (US)

( * ) Notice: Subject to any disclaimer, the term of this patent is extended or adjusted under 35 U.S.C. 154(b) by 0 days.

(21) Appl. No.: 16/017,297

(22) Filed: Jun. 25, 2018

(65) Prior Publication Data

US 2018/0305077 A1    Oct. 25, 2018

Related U.S. Application Data

(62) Division of application No. 15/274,716, filed on Sep. 23, 2016, now Pat. No. 10,040,601, which is a division of application No. 14/596,364, filed on Jan. 14, 2015, now Pat. No. 9,487,293.

(51) Int. Cl.
| | | |
|---|---|---|
| *B60P 7/08* | (2006.01) | |
| *B65D 19/44* | (2006.01) | |
| *B64D 9/00* | (2006.01) | |
| *B60P 7/13* | (2006.01) | |
| *B60P 7/10* | (2006.01) | |
| *B65D 88/12* | (2006.01) | |
| *B60P 7/18* | (2006.01) | |
| *B65D 19/00* | (2006.01) | |

(52) U.S. Cl.
CPC ............ *B65D 19/44* (2013.01); *B60P 7/10* (2013.01); *B60P 7/13* (2013.01); *B60P 7/132* (2013.01); *B60P 7/18* (2013.01); *B64D 9/00* (2013.01); *B64D 9/003* (2013.01); *B65D 19/0002* (2013.01); *B65D 88/12* (2013.01); *B65D 88/121* (2013.01); *B65D 88/129* (2013.01); *B65D 2519/00815* (2013.01)

(58) Field of Classification Search
CPC ...... B65D 19/44; B65D 88/121; B65D 88/12; B65D 88/129; B65D 19/0002; B65D 2519/00815; B60P 7/132; B60P 7/10; B60P 7/18; B60P 7/13; B64D 9/003; B64D 9/00
USPC ......... 410/35, 46, 66–67, 77–80, 82, 84–85, 410/90–91; 244/118.1, 137.1, 137.3; 108/55.1, 55.5
See application file for complete search history.

(56) References Cited

U.S. PATENT DOCUMENTS

| | | | |
|---|---|---|---|
| 4,322,192 | A | 3/1982 | Zavada et al. |
| 4,732,516 | A | 3/1988 | Borchardt et al. |
| 5,865,579 | A | 2/1999 | Thomas |
| 6,427,947 | B1 | 8/2002 | Rohrlick et al. |
| 7,118,314 | B2 | 10/2006 | Zhendong et al. |

(Continued)

FOREIGN PATENT DOCUMENTS

| | | |
|---|---|---|
| EP | 0233739 | 8/1987 |
| WO | WO1997009240 | 3/1997 |

*Primary Examiner* — Stephen T Gordon
(74) *Attorney, Agent, or Firm* — McDonnell Boehnen Hulbert & Berghoff LLP

(57) ABSTRACT

A pallet adapter, system and method for restraining air cargo during flight are disclosed. A pallet adapter shifts a shipping container in an inboard direction of an aircraft so that the container does not contact an interior structure of the aircraft. Rigid restraints restrain the container from moving in the vertical direction during flight. Corner fittings restrain the container from moving in the fore-and-aft direction and the side-to-side direction during flight.

20 Claims, 5 Drawing Sheets

(56) References Cited

U.S. PATENT DOCUMENTS

| | | |
|---|---|---|
| 9,487,293 B2 | 11/2016 | Noe |
| 10,040,601 B2 * | 8/2018 | Noe .................... B64D 9/00 |
| 2009/0191018 A1 * | 7/2009 | Kress .................. B64D 9/00 |
| | | 410/46 |

* cited by examiner (a) (b) (c) (d) (e) (f) (g) (h) (I) (j)

PALLET ADAPTER

CROSS-REFERENCE TO RELATED APPLICATION

This is a divisional application that claims the benefit of the filing date of U.S. Non-Provisional patent application Ser. No. 15/274,716, filed on Sep. 23, 2016 that issued as U.S. Pat. No. 10,040,601 on Aug. 7, 2018, which is a divisional application of U.S. Non-Provisional patent application Ser. No. 14/596,364, filed on Jan. 14, 2015, and which issued as U.S. Pat. No. 9,487,293 on Nov. 8, 2016, all of which are hereby incorporated by reference in their entireties.

FIELD

The disclosure is related to air cargo and, more particularly, to a pallet adapter for use with air cargo.

BACKGROUND

Air cargo is any goods transported in an aircraft, such as luggage, freight, and mail. Air cargo can be transported in either a passenger or cargo aircraft. Often, air cargo is stored in a shipping container, which is then placed onto a cargo pallet and restrained using restraint nets or straps. The restraint nets or straps have an elastic characteristic, which allows some movement of the container with respect to the pallet during flight.

Shipping containers come in standard sizes. For example, an ISO 1C container has a width and height of 8 feet, and a length of 20 feet. The ISO 1CC containers have the same width and length as the ISO 1C container, but are 6 inches taller having a height of 8 feet 6 inches.

Cargo pallets also come in standard sizes. For example, a NAS 3610-2G1P pallet, also referred to as a 20 foot pallet, is a 96 inch×238.5 inch cargo pallet. These 20 foot pallets are commonly used for transporting air cargo and are placed into standard cargo lanes in the aircraft.

Per regulations, a shipping container is not permitted to contact the interior structure of the aircraft. If a container is too tall after loading it onto a cargo pallet in one of the standard pallet locations, it may be possible to shift the container on top of the pallet towards the centerline of the aircraft and away from the interior structure of the aircraft to achieve the required spacing between the container and the aircraft structure. After shifting the container, a restraining mechanism is necessary to prevent the container from moving back towards the interior structure of the aircraft during flight. The standard restraint nets and straps allow too much movement to be used in this container shifting application.

SUMMARY

A system for restraining air cargo is disclosed. The system includes a pallet located in an aircraft, a pallet adapter attached to the pallet such that the pallet adapter extends beyond the pallet in an inboard direction of the aircraft, and at least one rigid restraint attached to a shipping container located on the pallet adapter and to at least one of the pallet and the pallet adapter. Alternatively, the rigid restraint may be attached to the shipping container and the cargo pallet.

A method for restraining cargo is also disclosed. The method includes attaching a pallet adapter to a pallet, attaching a container to the pallet adapter, and attaching at least one rigid restraint between the container and the pallet adapter. Alternatively, the rigid restraint may be attached between the container and the pallet.

A pallet adapter is also disclosed. The pallet adapter has a first surface and a second surface. The first surface is configured to be coupled to a pallet, and the second surface defines at least one recessed receptacle configured to receive a corresponding fitting coupled to a container. The pallet adapter also includes an extension zone configured to overhang the pallet and at least one connection point configured to receive a first end of a rigid restraint that is coupled at a second end to the container.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Presently preferred embodiments are described below in conjunction with the appended drawing figures, wherein like reference numerals refer to like elements in the various figures, and wherein.

Figure 1:
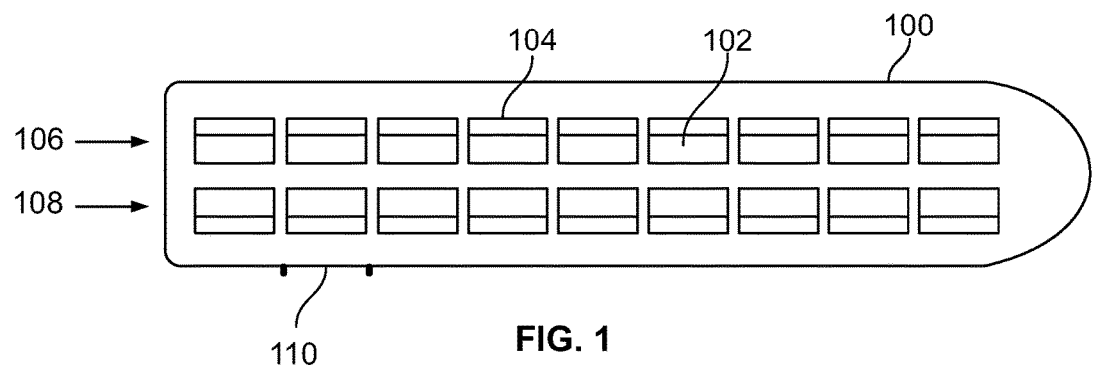
FIG. 1 is a diagrammatic representation of a top view of cargo stored in an aircraft, according to one example embodiment.

The drawings are provided for the purpose of illustrating example embodiments, but it is understood that the inventions are not limited to the arrangements and instrumentalities shown in the drawings.

DETAILED DESCRIPTION

FIG. 1 depicts an outline of a portion of an aircraft 100 containing shipping containers 102 attached to pallet adapters 104. The aircraft 100 has a first cargo lane 106 (e.g. right cargo lane) and a second cargo lane 108 (e.g., left cargo lane). The aircraft 100 may have more or less than two cargo lanes. For example, the aircraft 100 may also have a third cargo lane (e.g., center cargo lane) located between the first and second cargo lanes 106, 108.

FIG. 1 depicts nine shipping containers 102 in each of the cargo lanes 106, 108 that define the placement of unit load devices ("ULDs") within the aircraft 100. For example, a Weight and Balance manual for a given airplane may indicate the allowable locations for loading ULDs that may take the form of a cargo pallet 200 and net combination or a cargo container.

Typically, cargo handling systems have set dimensions side-to-side as a result of cargo hardware that is installed in the aircraft. This hardware includes guides that direct the cargo pallets within the aircraft to their intended location for flight. Furthermore, these guides provide the cargo pallets with lateral, and often vertical, restraint. Many times, it is possible to reposition the cargo pallet locations within the aircraft in the forward and aft direction via moveable end lock restraints, but the cargo hardware and guides are typically fixed and not moveable. As such, they define the available cargo lanes.

Further, end locks are retractable within the cargo lane to facilitate movement of the cargo pallets along the entire cargo lane. For example, when loading a cargo pallet into position for flight, one set of end locks may be erected into the restraint position. The pallet may then be moved within the system to engage these end locks at one end of the pallet, and then a second set of end locks may be erected at the opposite end of the pallet.

In other configurations, some cargo pallets may not require end locks. Instead, forward and aft movement may be limited by features located on one side of the cargo system that engage pallet features located along the same side. For example, the pallet may have at least one pair of fixed blocks coupled to the side of the pallet such that the pair of blocks define a cavity therebetween that is configured to receive a side lock restraint from the cargo hardware.

Referring again to FIG. 1, it is understood that the number and size of the shipping containers 102 can be varied as needed, so more or less than nine shipping containers may be located in each cargo lane 106, 108. The shipping containers 102 may be loaded into the aircraft 100 using an aircraft side cargo door 110; however, other access points may be available depending on the aircraft type, such as a rear or nose cargo door.

In view of the fixed nature of the cargo hardware and guides for a given cargo lane 106, 108 and cargo pallet, the pallet adapter 104 may be used to shift shipping container 102 in a lateral direction to achieve the required clearance relative to the internal structure of the aircraft 100. In particular, as shown in FIG. 1, pallet adapters 104 overlay the cargo pallets and shift the shipping containers 102 towards the interior of the aircraft 100 with respect to where cargo pallets are normally located in the cargo lanes 106, 108. As a result of the shifting, the shipping containers 102 may be taller than shipping containers that are aligned directly over the cargo pallets.

For example, while an ISO 1C container may properly fit within the aircraft 100 when positioned on a cargo pallet, an ISO 1CC container with its six additional inches may contact the interior structure of the aircraft 100 without the use of a pallet adapter 104. By shifting an ISO 1CC container several inches in the lateral direction towards the center of the aircraft 100 using a pallet adapter 104, the aircraft 100 may transport such larger container 102 without any changes to the airframe of the aircraft 100.

Figure 2A:
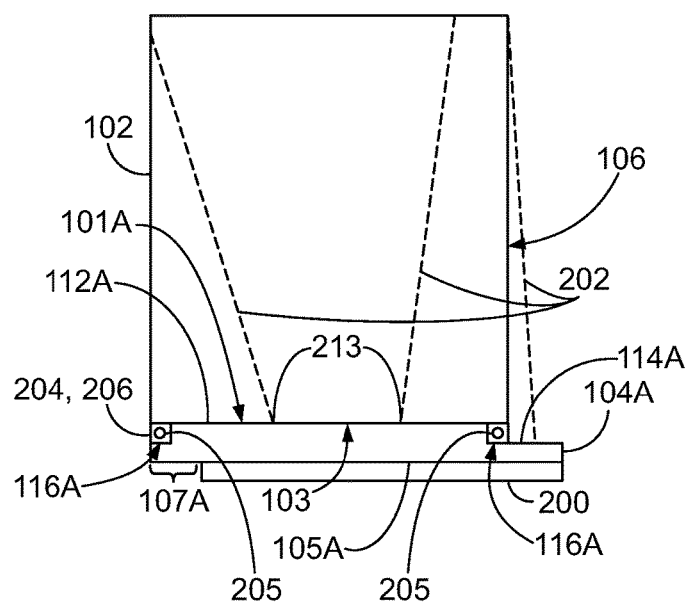
FIG. 2A is a diagrammatic representation of an end view of a shipping container restrained to a pallet adapter via rigid restraints that is coupled to a cargo pallet, according to one example embodiment.
Figure 2B:
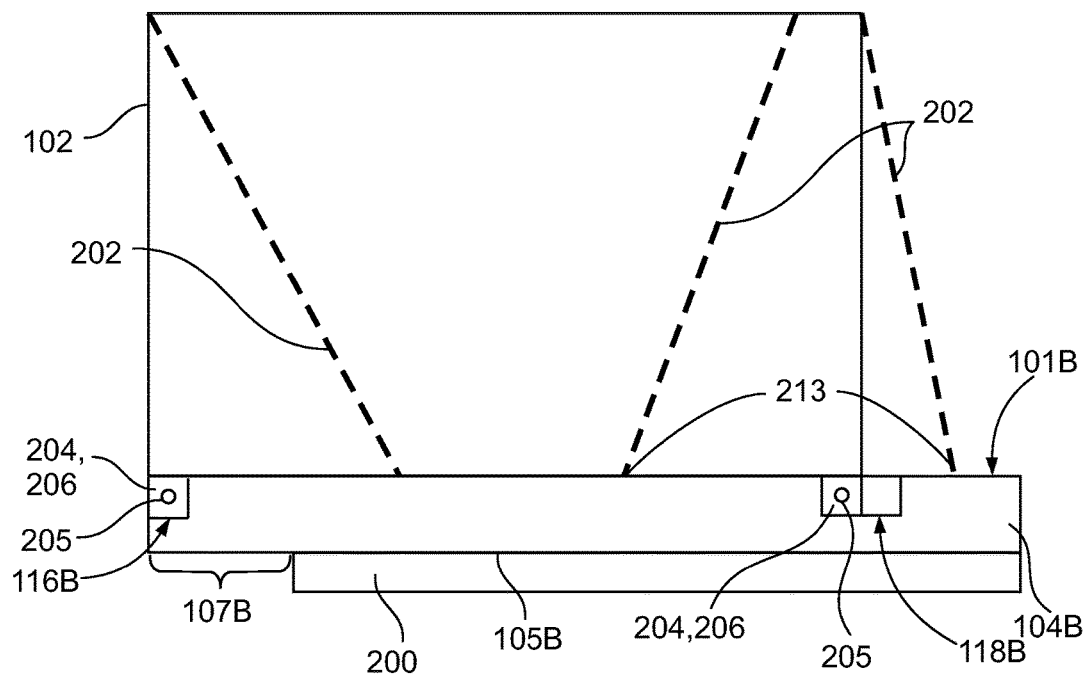
FIG. 2B is a diagrammatic representation of an end view of a shipping container restrained to a pallet adapter that is coupled to a cargo pallet, according to one example embodiment.

FIGS. 2A and 2B will be used to describe two different embodiments of a pallet adapter, namely pallet adapter 104A in FIG. 2A and pallet adapter 104B in FIG. 2B. Both FIGS. 2A and 2B depict an end view of a single shipping container 102 located on a single pallet adapter (104A in FIG. 2A and 104B in FIG. 2B). From this view, the height and the width of the shipping container 102 can be seen. While in FIG. 1 the cargo pallet is completely hidden from view by the pallet adapter 104, FIGS. 2A and 2B depict the pallet adapter 104A, 104B located on a cargo pallet 200. For example, the pallet 200 may be a PGA pallet, which is the International Air Transport Association (IATA) nomenclature for a 20 foot pallet. Other pallet types may also be used, including, but not limited to, a NAS3610-2G1P-type pallet.

The pallet adapter 104A, 104B includes an extension zone (107A in FIG. 2A and 107B in FIG. 2B) that overhangs or extends beyond the cargo pallet 200 in the inboard direction, towards the center of the aircraft 100. In one embodiment, the pallet adapter 104A, 104B extends nine inches beyond the pallet 200. In other embodiments, different extension lengths may be used as needed for shifting the container 102 away from the interior structure of the aircraft 100.

Figures 3A, 3B:
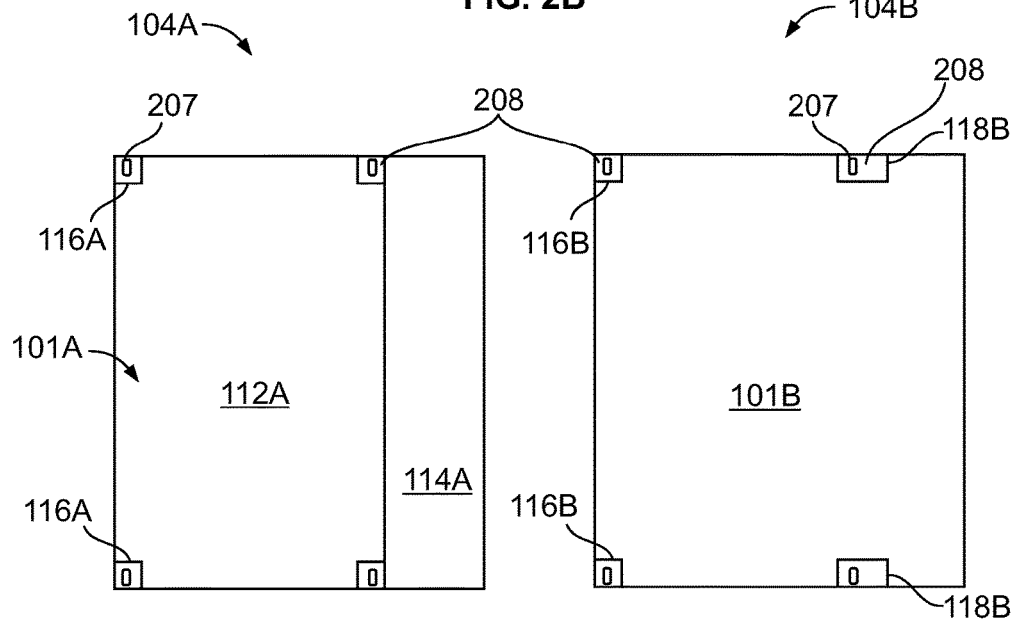
FIG. 3A is a diagrammatic representation of a top view of a pallet adapter according to the embodiment of FIG. 2A.
FIG. 3B is a diagrammatic representation of a top view of the pallet adapter according to the embodiment of FIG. 2B.
Figure 7:
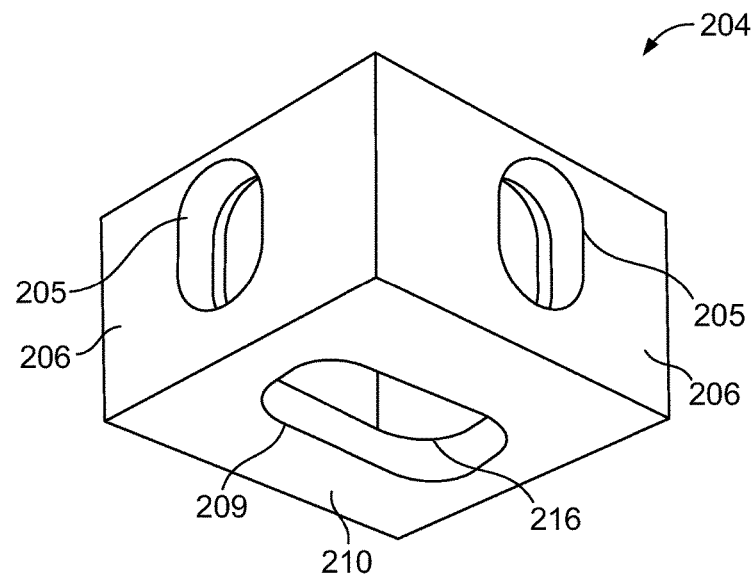
FIG. 7 is a diagrammatic representation of a perspective view of a container fitting according to one embodiment.
Figure 8:
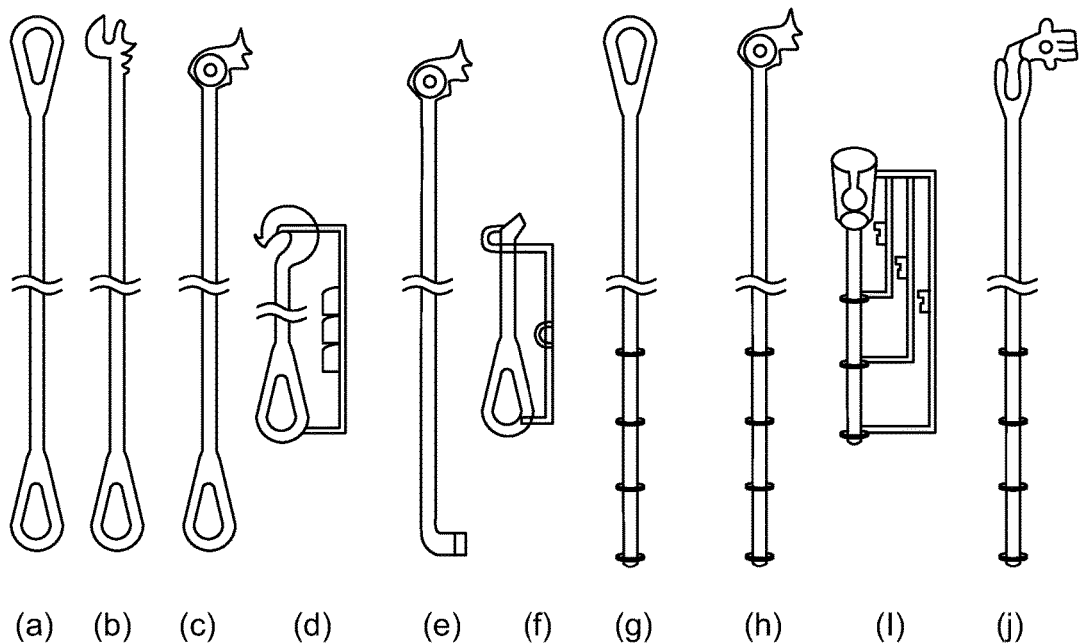
FIGS. 8 (a)-(j) are diagrammatic representations of side views of rigid restraints according to example embodiments.

In one embodiment shown in FIG. 2A, the pallet adapter 104A may have a first surface 105A and a second surface 101A. In one embodiment, the first surface 105A is a bottom surface and the second surface 101A is a top surface. The pallet adapter 104A may further have a stepped configuration such that the second surface 101A has an elevated portion 112A with a footprint that substantially corresponds to the base 103 of the shipping container 102 and a base portion 114A located outboard of the elevated portion 112A. With reference to FIGS. 2A, 3A and 7, each of the four corners of the elevated portion 112A defines a two-walled recessed receptacle 116A configured to receive a fitting 204 having apertures 205 defined in outward-facing walls 206 (see FIG. 7), as discussed in detail below. A male component 207 is disposed at the base 208 of each receptacle 116A that is configured to be received in a female aperture 209 defined in the base 210 of fitting 204, shown in FIGS. 3A-B and 7. This stepped configuration permits the two recessed receptacles located on the outboard side 106 of container 102 to be unobstructed by the pallet adapter 104. In various other embodiments, additional fittings 204 may be disposed along the sides of container 102 with recessed receptacles disposed in corresponding locations in the pallet adapter 104A.

In another embodiment shown in FIG. 2B, a first surface 105B and a second surface 101B. In one embodiment, the first surface 105B is a bottom surface and the second surface 101B is a top surface. The second surface 101B is substantially planar across both the extension zone and the area configured to overlie the cargo pallet 200 itself. With reference to FIGS. 2B and 3B, the pallet adapter 104B may have two-walled recessed receptacles 116B at both corners of the extension zone 107B and may have two three-walled recessed receptacles 118B disposed where the two outboard corners of the container 102 will rest above the cargo pallet 200 inboard to the extension zone 107B. Each of the recessed receptacles 116B, 118B is configured to receive a fitting 204, as discussed in detail below. As shown, the three-walled recessed receptacles 118B may be sized to accommodate the engagement of handling and securing devices (not shown) within the apertures 205 on outward-facing walls 206 of fittings 204. Alternatively, the three-walled recessed receptacles 118B may be substantially the same size as the two-walled recessed receptacles 116B.

Figure 4:
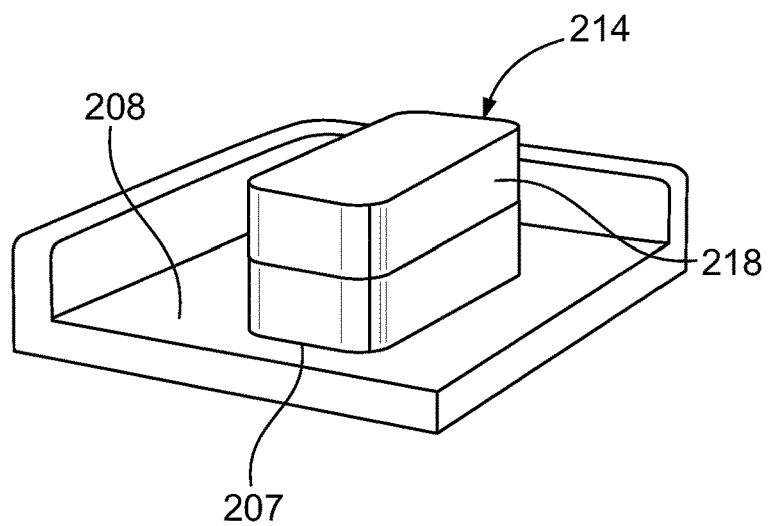
FIG. 4 is a diagrammatic representation of an isometric view of a twistlock according to one embodiment.

A male component 207 is disposed at the base 208 of each receptacle 116B and 118B (see FIGS. 3A, 3B and 4) that is configured to be received in a female aperture 209 defined in the base 210 of fitting 204, shown in FIG. 7. In various other embodiments, additional fittings 204 may be disposed along the sides of container 102 with recessed receptacles disposed in corresponding locations in the pallet adapter 104B. The pallet adapter 104 may be formed using aluminum, steel, or other suitable material that does not deform under the weight of the shipping container 102.

In addition, the pallet adapter (regardless of the particular embodiment) may be a single piece that spans the entire length and width of the cargo pallet 200 and further extends inboard the necessary distance to provide clearance between the top of the shipping container 102 and the aircraft. For example, in one embodiment in which the cargo pallet is a size code G and the aircraft is a 747 freighter, the pallet 200 has a length of about 238 inches and a width of about 96 inches and the pallet adapter 104 may have a length of about 238 inches and may have a width ranging from about 98 inches to about 111 inches.

In an alternative embodiment for a 747 freighter aircraft, the pallet adapter 104 may include a plurality of sections. One section may be disposed at the fore end of the cargo pallet, another end may be disposed at the aft end of the pallet and a plurality of optional sections may be disposed between the fore and aft ends, where each section of the pallet adapter 104 engages seat tracks on either side of the cargo pallet and also provides the needed extension on the inboard side. Each of these sections may be about 18 inches to about 24 inches long and may have a width ranging from about 98 inches to about 111 inches. These dimensions may vary based on the thickness of the pallet adapter 104. The thickness of the pallet adapter 104 will also bring the top of the shipping container closer to the aircraft frame and this consideration also helps guide the collective dimensions of the pallet adapter. In addition, a different type of airplane or cargo pallet may require more offset or less offset. Other variables may include the allowed center of gravity offset for a given cargo handling restraint system.

Figure 5:
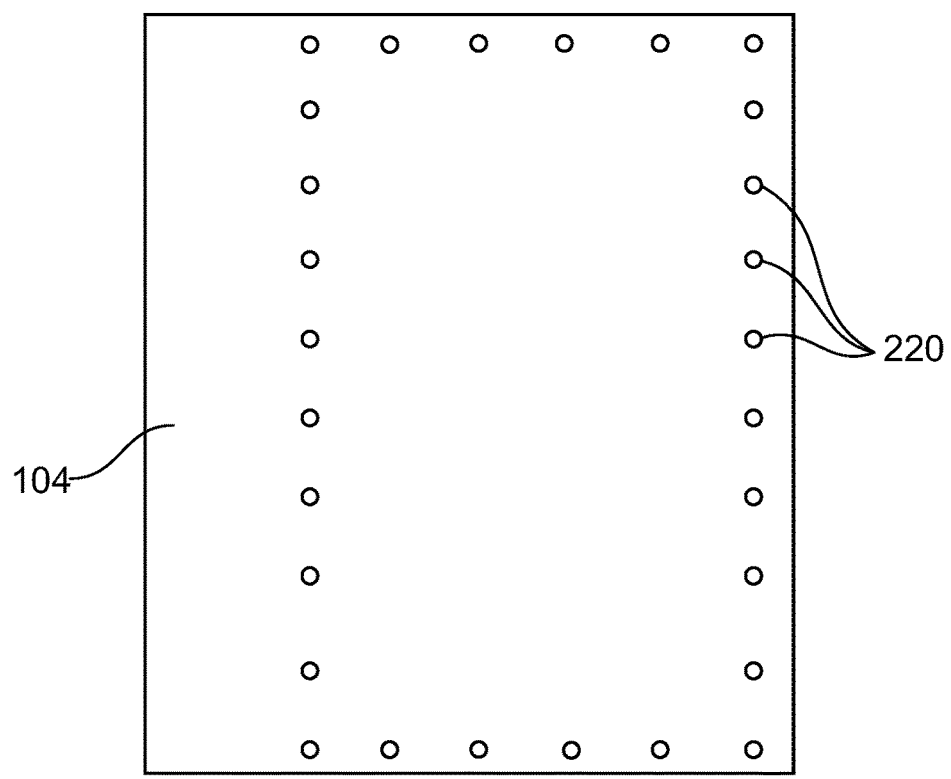
FIG. 5 is a diagrammatic representation of a bottom view of a pallet adapter according to one embodiment.
Figure 6:
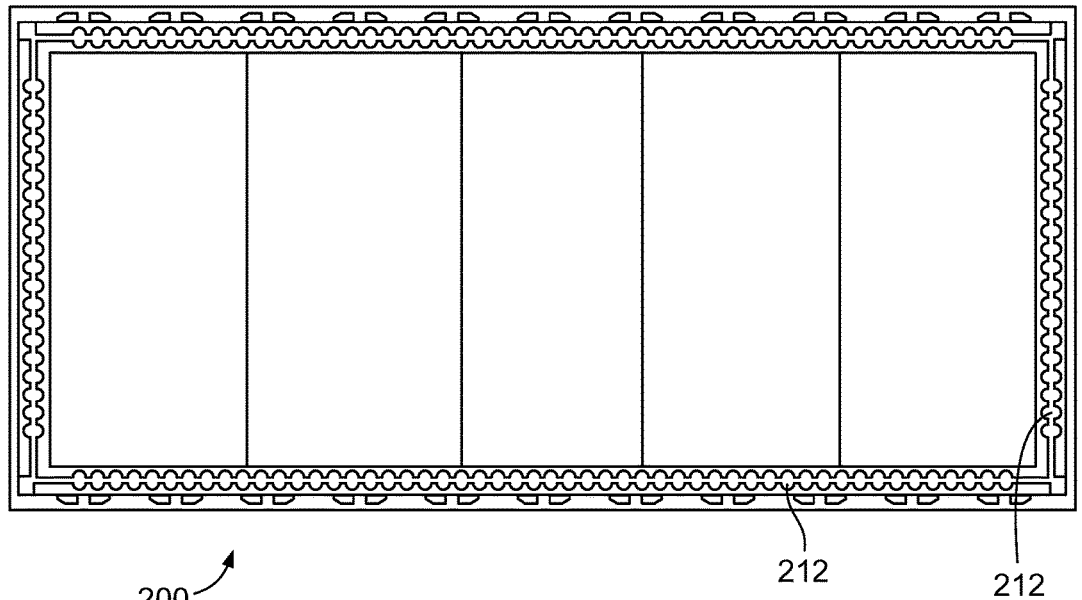
FIG. 6 is a diagrammatic representation of a top view of a cargo pallet according to one embodiment.

In use, the pallet adapter 104 is configured to be connected to the cargo pallet 200. As shown in FIG. 6, the cargo pallet 200 typically includes a seat track-type 212 interface that includes connection points 213 used for attaching cargo nets and straps. As the nets and straps with their elastic characteristics are not suitable in this container-shifting application, the pallet adapter 104 is instead attached to the seat track features 212 (e.g., track holes) around the perimeter of the cargo pallet 200. As shown in FIG. 5, complementary studs 220 having over-sized heads are configured to be retained in the seat track features 212 and are disposed on the first surface 103 of the pallet adapter 104. Other connection mechanisms may also be used.

FIGS. 2A and 2B also depict three rigid restraints 202. One end of the restraint 202 is connected to the shipping container 102, while the other end is attached to the pallet adapter 104A, 104B. Alternatively, the other end of the rigid restraint 202 may attach directly to the seat track features 212 of the cargo pallet 200 via known connection mechanisms. The shipping container 102 and the pallet adapter 104 include connection points for attaching the restraints 202, such as eyes, holes, slots, knobs, hooks, and other types of securing points.

The rigid restraints 202 may be container lashing rods used in lashing systems that secure containers on cargo ships. Example lashing rods are shown in FIGS. 8(a)-(j). The rigid restraints 202 may also be another type of non-elastic restraining system. The rigid restraints 202 may be manufactured using steel or other inflexible materials.

The restraints 202 include a fastening mechanism on each end of a rod. In one example, the fastening mechanism may be a clevis and pin. In another example, the fastening mechanism may be an eye or a hook. Other fastening mechanisms may also be used. The two ends of the rod may have a different type of fastening mechanism, one type for connecting to the container 102 and another type for connecting to the pallet adapter 104 or pallet 200.

The rigid restraints 202 maintain a positive restraint on the shipping container 102, which prevents or reduces movement of the container 102 during flight. In particular, the rigid restraints 202 restrain movement in the vertical direction.

While three restraints 202 are depicted in FIGS. 2A and 2B, it is understood that a different number of restraints 202 may be used. (Generally, an equal number of restraints are located on the opposite end of the container 102.) The number of restraints 202 used may be determined by the maximum amount of payload that the shipping container or cargo pallet is capable of supporting. In one embodiment, this may be determined as part of the initial design for the pallet adapter.

The shipping container 102 is connected to the pallet adapter 104 with fittings 204, shown in FIG. 7. The fittings 204 restrain movement in both the forward-aft direction and the side-to-side direction. While two fittings 204 are depicted in FIGS. 2A and 2B, two additional fittings 204 are located at the other end of the shipping container 102 and at corresponding locations on the pallet adapter 104. While four fittings 204 are preferably used based on standard shipping container designs, in some applications, a different number of fittings 204 may be used.

The fitting 204 may be similar to an International Standard ISO 1161 container corner fitting. In the examples shown in FIGS. 3A, 3B and 7, the fitting 204 engages a male portion 207, for example, a corner post located on the base 208 of a receptacle 116A,B or 118A,B on the pallet adapter 104A, 104B and a female portion 209, for example an aperture, on the base 210 of the fitting 204 that fits over the male portion 207. The fitting is preferably fixed to the shipping container 102 and is configured to engage the pallet adapter 104 via receptacles 116A,B and 118A,B, as described. Alternatively, the fitting 204 may include a male portion of the corner fitting located on the shipping container 102 and a female portion of the corner fitting located on the pallet adapter 104A, 104B.

The male and female portions of the container corner fitting mate the container 102 to the pallet adapter 104. A lock, such as a twistlock 214 shown in FIG. 4, may be used to lock the fitting 204 in place during flight. The twistlock 214 may include a horizontal load-bearing surface 208 configured to support a bottom corner fitting 204 of a fully loaded container 102. The twistlock 214 may further include a fixed collar, for example male portion 207, configured to project upwards into the aperture 209 of the base 210 of the fitting 204 to a height no lower than the level of the inner surface 216 of fitting 204. The twistlock 214 may also include a rotatable head 218.

While the container corner fitting 204 is preferred due to its widespread use, other fitting designs may be used for the fitting 204. The fitting 204 may be formed using carbon steel, stainless steel, aluminum, or other suitable material.

Figure 9:
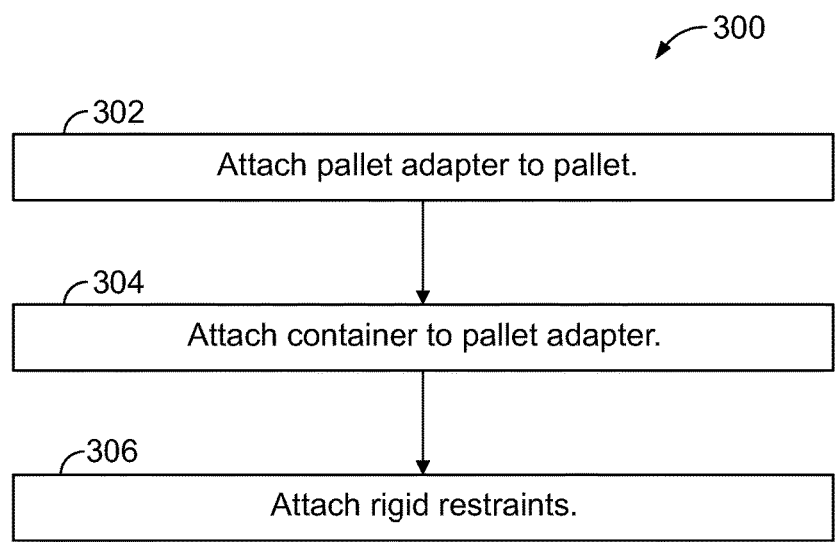
FIG. 9 is a flowchart of a method for restraining cargo, according to one example embodiment.

FIG. 9 depicts a method 300 for restraining cargo in an aircraft 100. At block 302, a cargo handler attaches a pallet adapter 104 to a cargo pallet 200. The cargo handler may permanently install the pallet adapter 104 on the cargo pallet 200 when the aircraft 100 is provisioned for a particular shipping container type. Alternatively, the cargo handler may attach the pallet adapter 104 to the cargo pallet 200 in a manner that allows for removal when the pallet adapter 104 is no longer needed or a different pallet adapter 104 having a different extension length and/or different fitting locations is needed.

At block 304, the cargo handler attaches the shipping container 102 to the pallet adapter 104. In one example, the shipping container 102 has a female portion 209 of the fitting 204 at each of its four corners and the pallet adapter 104 has a male portion 207 of the fitting 204 at corresponding locations to the four corners. In this example, the cargo handler moves the container 102 such that the male portion 207 of the fitting 204 enters the female portion 209 of the fitting 204 using standard shipping container handling procedures.

At block 306, the cargo handler attaches rigid restraints 202 from a top edge of the shipping container 102 to either the pallet adapter 104 or the pallet 200. Prior to attaching the restraints 202, the cargo handler may receive a tie down plan that indicates the number of restraints 202 and the attachment locations for each of the restraints 202.

With the use of the pallet adapter 104, the rigid restraints 202, and the fittings 204, a larger shipping container 102 may be used for transporting air cargo. For example, ISO 1CC containers may be transported when previously the aircraft 100 could only transport ISO 1C containers or smaller. Beneficially, standard shipping container and cargo pallet types used in intermodal transportation may be used, and no modifications to the airframe or other structural features of the aircraft 100 are necessary. This container shifting system and method may also be used with other cargo transportation vehicles, such as cargo ships.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method for restraining cargo, the method comprising:
    attaching a first surface of a pallet adapter to a pallet such that an extension zone of the pallet adapter overhangs the pallet, wherein the extension zone of the pallet adapter has two corners that each have a two-walled recessed receptacle;
    attaching a container to a second surface of the pallet adapter such that two fittings coupled to the container are each received in one of the two-walled recessed receptacles of the extension zone of the pallet adapter; and
    attaching at least one rigid restraint between the container and one of the pallet adapter and the pallet.

2. The method of claim 1, wherein attaching the first surface of the pallet adapter to the pallet includes attaching the pallet adapter to seat track features of the pallet.

3. The method of claim 2, wherein the seat track features of the pallet comprise a plurality of track holes arranged around a perimeter of the pallet, wherein a plurality of studs having over-sized heads are disposed on the first surface of the pallet adapter, and wherein attaching the pallet adapter to the seat track features of the pallet includes retaining the plurality of studs having over-sized heads within the plurality of track holes.

4. The method of claim 1, wherein attaching the container to the second surface of the pallet adapter includes shifting the container away from an interior structure of an aircraft relative to the pallet thereby providing a clearance between a top of the container and the interior structure of the aircraft.

5. The method of claim 1, wherein the at least one rigid restraint includes a container lashing rod, and wherein attaching the at least one rigid restraint between the container and one of the pallet adapter and the pallet includes attaching a first end of the container lashing rod to a top edge of the container and attaching a second end of the container lashing rod to one of the pallet adapter and the pallet.

6. The method of claim 1, wherein attaching the at least one rigid restraint between the container and one of the pallet adapter and the pallet includes attaching a first end of the at least one rigid restraint to a top edge of the container and attaching a second end of the at least one rigid restraint to a connection point of the pallet adapter or the pallet in the form of an eye, a hole slot, a knob or a hook.

7. The method of claim 1, further comprising:
    maintaining a positive restraint on the container via the at least one rigid restraint and thereby reducing movement of the container in a vertical direction.

8. The method of claim 1, wherein attaching the at least one rigid restraint between the container and one of the pallet adapter and the pallet includes implementing a tie down plan that indicates a predetermined number of rigid restraints and corresponding attachment locations for each end of the predetermined number of rigid restraints.

9. The method of claim 1, wherein attaching the container to the second surface of the pallet adapter such that the two fittings coupled to the container are each received in one of the two-walled recessed receptacles of the extension zone of the pallet adapter includes receiving a male component disposed at a base of each of the two-walled recessed receptacles within a corresponding female aperture defined in a base of each of the two fittings coupled to the container.

10. The method of claim 9, wherein each male component comprises a fixed collar and a rotatable head that is configured to project upwards into the corresponding female aperture such that the rotatable head is disposed at a height above an inner surface of the base of each of the two fittings coupled to the container.

11. The method of claim 10, further comprising:
    accessing the rotatable head of each male component via at least one aperture defined in an outward-facing wall of each of the two fittings coupled to the container; and
    rotating the rotatable head into a locked position.

12. The method of claim 1, wherein the pallet adapter has a plurality of separate sections that includes a first section and a second section, wherein attaching the first surface of the pallet adapter to the pallet such that the extension zone of the pallet adapter overhangs the pallet includes attaching the first section of the pallet adapter to a fore end of the pallet and attaching the second section of the pallet adapter to an aft end of the pallet.

13. The method of claim 12, wherein the plurality of separate sections of the pallet adapter includes a third section, wherein attaching the first surface of the pallet adapter to the pallet such that the extension zone of the pallet adapter overhangs the pallet further includes attaching the third section of the pallet adapter to the pallet between the fore end and the aft end of the pallet.

14. The method of claim 1, further comprising:
    removing the container from the pallet adapter;
    removing the pallet adapter from the pallet; and
    attaching a first surface of a second pallet adapter to the pallet such that an extension zone of the second pallet adapter overhangs the pallet, wherein a length of the extension zone of the second pallet adapter in an inboard direction is different than a length of the extension zone of the pallet adapter removed from the pallet.

15. The method of claim 14, further comprising:
attaching a second container to a second surface of the second pallet adapter, wherein the second container is taller than the container removed from the pallet adapter.

16. The method of claim 15, wherein the length of the extension zone of the second pallet adapter is greater than the length of the extension zone of the pallet adapter removed from the pallet.

17. The method of claim 14, further comprising:
prior to removing the container from the pallet adapter, accessing a twistlock disposed within each of the two fittings coupled to the container via at least one aperture defined in an outward-facing wall of each of the two fittings coupled to the container; and
rotating the twistlock into an unlocked position.

18. The method of claim 14, further comprising:
prior to removing the container from the pallet adapter, detaching the at least one rigid restraint from between the container and one of the pallet adapter and the pallet.

19. The method of claim 1, further comprising:
removing the container from the pallet adapter;
removing the pallet adapter from the pallet; and
attaching a second container to the pallet, wherein the second container is shorter than the container removed from the pallet adapter.

20. The method of claim 19, wherein the container removed from the pallet adapter is an ISO 1CC container and the second container attached to the pallet is an ISO 1C container.

* * * * *